United States Patent [19]

Bandemor

[11] 4,007,764
[45] Feb. 15, 1977

[54] AUTOMATIC FLUID FILLING DEVICE FOR BATTERIES

[75] Inventor: Royal F. Bandemor, Menomonee Falls, Wis.

[73] Assignee: Outboard Marine Corporation, Waukegan, Ill.

[22] Filed: Feb. 9, 1976

[21] Appl. No.: 656,516

[52] U.S. Cl. .................................. 141/35; 141/59; 141/198
[51] Int. Cl.² .......................................... B65B 3/26
[58] Field of Search ............................. 141/1, 4–7, 141/35, 59, 94, 95, 192, 198, 285; 222/154–159

[56] References Cited

UNITED STATES PATENTS 3,318,345  5/1967  Beau .................................. 141/198
3,534,785  10/1970  Bensen ................................ 141/198

*Primary Examiner*—Houston S. Bell, Jr.
*Attorney, Agent, or Firm*—Michael, Best & Friedrich

[57] ABSTRACT

Disclosed herein is an automatic fluid filling device for maintaining fluid at a desired level in one or more battery cells each having a cell opening. The device comprises a plurality of members each removably insertable into a battery cell, and each including wall means having a first portion sealingly engaging a battery cell opening and also having a second portion located above the first portion, which second portion partially defines a generally air-tight chamber located above the battery cell opening, which second portion also includes an aperture and a removable cap which sealingly engages the aperture for allowing access to the fluid in the battery cell. The wall means further includes a third portion which partially defines a passage located below and in communication with the chamber and in communication with the battery cell for affording fluid flow from the passage to the battery cell. Each member also includes a fluid level control tube having an upper opening extending into and being in communication with the chamber and having a lower opening extending into the battery cell to the general level at which the fluid is desired to be maintained in the battery cell. Conduit means can be provided for connecting together the member passages in series, along with a reservoir connected to an end one of the series of connected passages for affording fluid flow through the passages and into the battery cells.

9 Claims, 3 Drawing Figures

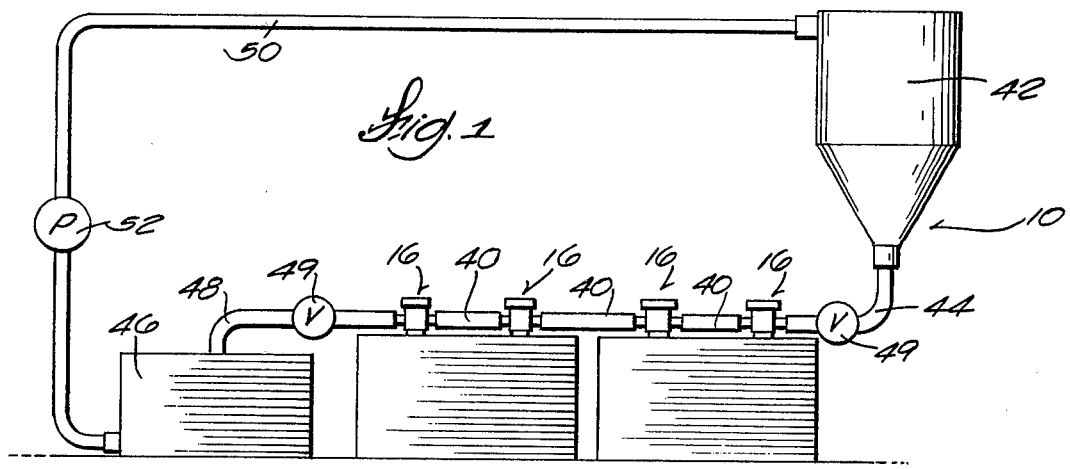
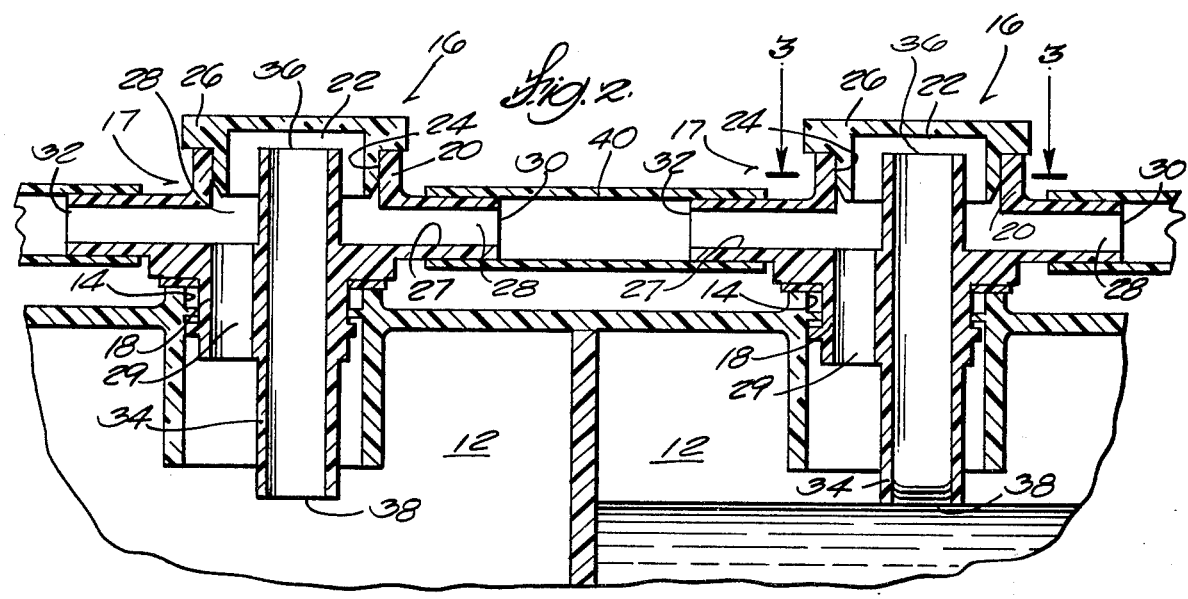
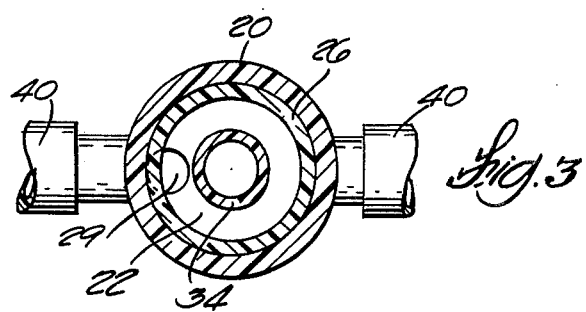

AUTOMATIC FLUID FILLING DEVICE FOR BATTERIES

BACKGROUND OF THE INVENTION

The invention relates generally to devices for simplifying the filling and maintenance of fluids in battery cells and more particularly to an automatic fluid filling device for maintaining fluid at a desired level in conventional lead acid batteries. Prior fluid filling devices are disclosed in Beall U.S. Pat. No. 3,318,345, issued May 9, 1967, Lowe U.S. Pat. No. 3,189,063, issued June 15, 1965, Droste U.s. Pat No. 2,645,907, issued July 23, 1953, Heckendorf U.S. Pat. No. 2,670,889, issued Mar. 2, 1954, Harstick U.S. Pat. No. 2,668,001, issued Feb. 2, 1954, and Duncan U.S. Pat. No. Re. 23,543, reissued Sept. 2, 1952.

SUMMARY OF THE INVENTION

In accordance with an embodiment of the invention, the invention provides an automatic fluid filling device for maintaining fluid at a desired level in a battery cell having a cell opening, which device comprises a member removably insertable into the battery cell, which member includes wall means having a first portion sealingly engaging the battery cell opening, together with a second portion located above the first portion, which second portion partially defines a generally airtight chamber located above the battery cell opening, which second portion also includes an aperture and a removable cap which sealingly engages the aperture for allowing access to the fluid in the battery cell. The wall means further includes a third portion partially defining a passage located below and in communication with the chamber and in communication with the battery cell for affording fluid flow from the passage to the battery cell, which third portion also includes an inlet for affording flow of a fluid into the passageway and includes an outlet for affording flow of the fluid out of the passageway. The member also includes a fluid level control tube having an upper opening extending into and being in communication with the chamber and having a lower opening extending into the battery cell to the general level at which the fluid is desired to be maintained in the battery cell.

Also in accordance with an embodiment of the invention, the invention provides an automatic fluid filling device for maintaining fluid at a desired level in a plurality of battery cells, each having a cell opening, said device comprising a plurality of members each respectively associated with, and removably insertable into a battery cell. Conduit means are provided connecting together the member passages in series, together with a reservoir connected to an end one of the series of connected passages for affording fluid flow through the passages and into the battery cell.

Also in accordance with an embodiment of the invention, the invention provides an automatic fluid filling device including a sump connected to the remaining end one of the series of connected passages for receiving fluid from the passages.

Still further in accordance with an embodiment of the invention, the invention provides an automatic fluid filling device in which the respective wall means and fluid level control tube of each of the members are integrally connected, each of which members is composed of an acrylic plastic.

One of the principal features of the invention is provision of an automatic fluid filling device which includes a member which can be removably inserted into, and sealing engages the battery cell opening of a conventional lead acid battery.

Another of the principal features of the invention is the provision of an automatic fluid filling device which facilitates quick and efficient filling of battery cells with fluid.

Another of the principal features of the invention is the provision of an automatic fluid filling device which automatically regulates the fluid level in a plurality of battery cells.

Another of the principal features of the invention is the provision of an automatic fluid filling device which allows selective access to the fluid in each of the battery cells to be filled.

Other features and advantages of the embodiments of the invention will become known by reference to the following drawings, general description and claims.

DRAWINGS

FIG. 1 is a diagramatic view of an automatic fluid filling device embodying various of the features of the invention.

FIG. 2 is a partial side sectional view of the automatic fluid filling device shown in FIG. 1.

FIG. 3 is a top sectional view taken along line 3—3 of FIG. 2.

Before explaining at least one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is an automatic fluid filling device 10 for maintaining fluid at a desired level in one or more battery cells 12 each having a cell opening 14. The filling device 10 includes a plurality of members 16, each preferably having the same construction. Each member 16 includes wall means 17 having a first portion 18 which sealingly engages a battery cell opening 14. The first portion 18 is dimensioned so that it can be removably inserted into the battery cell opening 14 of any conventional lead acid battery. The wall means 17 has a second portion 20 which partially defines a generally air-tight chamber 22 located above the battery cell opening 14. The second portion 20 also includes an aperture 24 and a removable cap 26 which sealingly engages the aperture 24, which cap 26 allows access to the fluid in the battery cell 12.

The wall means 17 includes a third portion 27 which partially defines a passage 28 located below and in communication with the chamber 22 and in communication with the battery cell 12 through a water fill tube 29 for affording fluid flow through the passage 28 to the battery cell 12. The third portion 27 also includes an inlet 30 for affording flow of a fluid into the passageway 28 and includes an outlet 32 for affording flow of the fluid out of the passageway 28.

Each member 16 also includes a fluid level control tube 34 having an upper opening 36 extending into and being in communication with the chamber 22 and also having a lower opening 38 which extends into the battery cell 12 to the general level at which the fluid is desired to be maintained as will be explained in more detail below.

The member wall means 17 and fluid level control tube 34 can be constructed and composed of any suitable generally fluid impermeable material. The respective wall means 17 and fluid level control tube 34 of each of the members 16 can be integrally connected and composed of an acrylic plastic, which acrylic plastic is preferably transparent to allow observation of the filling of the battery cells 12 with fluid.

Although a single member 16 could be used to fill a single battery cell and then removed from the battery cell and used again to fill another battery cell, the filling device 10 preferably includes a plurality of members 16 which can be used to automatically fill the respectively associated battery cells of one or more batteries. Conduit means or conduits 40 are provided for connecting together the member passages 28 in series. A reservoir 42 is connected by a conduit 44 to the inlet 30 of an end one of the series of connected passages 28 for affording fluid flow through the passages 28 and into the battery cells 12.

In order to prevent the loss of fluid, such as distilled water, during filling operations, a sump 46 can be connected by a conduit 48 to the outlet 32 of the remaining end one of the series of connected passages 28 for receiving any overflow fluid from the passages 28. A conduit 50 can be provided connecting together the sump 46 and the reservoir 42 so that any fluid passing through the passages 28 to the sump 46 can be recirculated by a pump 52 through conduit 50 back to the reservoir 42.

During the filling operation, fluid flows from the reservoir 42 through the serially connected passages 28, resulting in the battery cells 12 being sequentially filled to the desired level. Preferably, the fluid flowing from the reservoir 42 has a pressure head great enough to cause the fluid to completely fill the passage 28 located over the battery cell 12 being filled. More specifically, the fluid fills each of the battery cells 12 until the fluid level in each battery cell rises to the general level of the lower opening 38 of the fluid level control tube 34. When the lower opening 38 is sealed by the rising fluid in a battery cell 12, the flow of fluid into the battery cell stops, the fluid pressure head having caused a small amount of fluid to rise into the level control tube 34 to the point where there exists a balance of pressure between the air in the battery cell 12, the air in the chamber 22 located above the level control tube 34, and the pressure head of the fluid supplied from the elevated reservoir 42. Once the above described pressure balance occurs, fluid will not further enter the battery cell until the fluid level again drops below the lower opening 38 of the fluid level control tube 34.

As shown in FIG. 2, after the first battery cell 12 connected in series by the members 16 has been filled, the next battery cell in the series will be filled in a similar manner, the filling process being repeated until all the battery cells have been filled. So long as there is fluid in the reservoir 42, the level of fluid in the battery cells 12 will automatically be maintained at the desired level where the lower opening 38 of the level control tube 34 is sealed.

If it is desired to disconnect the reservoir 42 and sump 46 after the filling operation, a valve 49 can be provided in each of conduits 44 and 48, which valves 49 can be closed to prevent spillage of fluid from the battery cells 12 after the reservoir 42 and sump 46 have been disconnected from conduits 44 and 48 respectively. Each removable cap 26 can be removed from a respectively associated aperture 24 for providing access to the fluid in a respectively associated battery cell 12 so that the specific gravity of the fluid in each battery cell can be tested, such as by the use of a conventional hydrometer. When the battery cells again need to be filled with fluid, the reservoir 42 and sump 47 can be reconnected to conduits 44 and 48, the valves 49 opened and the above described filling operation repeated.

Various features of the invention are set forth in the following claims.

What is claimed is:

1. An automatic fluid filling device for maintaining fluid at a desired level in a battery cell having a cell opening, said device comprising a member which is removably insertable into the battery cell, said member including wall means having a first portion sealingly engaging the battery cell opening, said wall means also having a second portion located above said first portion, said second portion partially defining a generally air-tight chamber located above the battery cell opening, said second portion including an aperture and a removable cap which sealingly engages said aperture for allowing access to the fluid in the battery cell, said wall means further having a third portion partially defining a passage located below and in communication with said chamber and in communication with the battery cell for affording fluid flow from said passage to the battery cell, said third portion including an inlet for affording flow of a fluid into said passageway and also including an outlet for affording flow of the fluid out of said passageway, said member also including a fluid level control tube having an upper opening extending into and being in communication with said chamber and having a lower opening extending into the battery cell to the general level at which the fluid is desired to be maintained in the battery cell.

2. An automatic fluid filling device in accordance with claim 1 and further including a fluid reservoir located above said passage and connected to said inlet for affording fluid flow into said passage.

3. An automatic fluid filling device in accordance with claim 1 and further including a sump located below said passage for receiving fluid from said outlet.

4. An automatic fluid filling device in accordance with claim 1 wherein said wall means and said level control tube are integrally connected parts of said member.

5. An automatic fluid filling device in accordance with claim 4 wherein said member is composed of an acrylic plastic.

6. An automatic fluid filling device for maintaining fluid at a desired level in a plurality of battery cells each having a cell opening, said device comprising a plurality of hollow members each respectively associated with, and removably insertable into a battery cell, each of said hollow members including wall means having a first portion sealingly engaging one of the battery cell openings, said wall means also having a second portion located above said first portion, said second portion partially defining a generally air-tight chamber located above said one of the battery cell openings, said second portion including an aperture and a removable cap which sealingly engages said aperture for allowing access to the fluid in the battery cell having said one of the battery cell openings, said wall means further having a third portion partially defining a passage located below and in communication with said chamber and in communication with the battery cell having said one of the battery cell openings for affording fluid flow from said passage to the battery cell, each of said hollow members also including a fluid level control tube having an upper opening extending into and being in communication with said chamber and having a lower opening extending into the battery cell having said one of the battery cell openings to the general level at which the fluid is desired to be maintained in the battery cell, conduit means connecting together said passages in series, and a reservoir connected to an end one of the series of connected passages for affording fluid flow through said passages and into the battery cells.

7. An automatic fluid filling device in accordance with claim 6 and further including a sump connected to the remaining end of one of the series of connected passages for receiving fluid.

8. An automatic fluid filling device in accordance with claim 6 wherein said respective wall means and fluid level control tube of each of said members are integrally connected.

9. An automatic fluid filling device in accordance with claim 7 wherein said members are composed of an acrylic plastic.

* * * * *

UNITED STATES PATENT OFFICE
CERTIFICATE OF CORRECTION

Patent No. 4,007,764      Dated February 15, 1977

Inventor(s) Royal F. Bandemor

It is certified that error appears in the above-identified patent and that said Letters Patent are hereby corrected as shown below:

Column 6, line 6      delete "of" after the word "end".

Signed and Sealed this twenty-third Day of August 1977

[SEAL]

Attest:

RUTH C. MASON
*Attesting Officer*

C. MARSHALL DANN
*Commissioner of Patents and Trademarks*